United States Patent
Guan et al.

(10) Patent No.: US 12,404,627 B2
(45) Date of Patent: Sep. 2, 2025

(54) CROSS-LINKED ENHANCED META-ARAMID AND PREPARATION METHOD THEREFOR

(71) Applicant: Yantai Tayho Advanced Materials Co. Ltd., Yantai (CN)

(72) Inventors: Zhenhong Guan, Yantai (CN); Zhongkai Ren, Yantai (CN); Shidong Pan, Yantai (CN); Dan Li, Yantai (CN); Xubo Zhou, Yantai (CN); Wenhua Yang, Yantai (CN)

(73) Assignee: TAYHO ADVANCED MATERIALS GROUP CO., LTD., Shandong (CN)

( * ) Notice: Subject to any disclaimer, the term of this patent is extended or adjusted under 35 U.S.C. 154(b) by 649 days.

(21) Appl. No.: 17/680,363

(22) Filed: Feb. 25, 2022

(65) Prior Publication Data

US 2022/0259797 A1    Aug. 18, 2022

Related U.S. Application Data

(63) Continuation of application No. PCT/CN2020/102922, filed on Jul. 20, 2020.

(30) Foreign Application Priority Data

Aug. 30, 2019  (CN) .......................... 201910818877.4

(51) Int. Cl.
*D06M 13/395*    (2006.01)
*D06M 101/36*    (2006.01)

(52) U.S. Cl.
CPC ...... *D06M 13/395* (2013.01); *D06M 2101/36* (2013.01)

(58) Field of Classification Search
CPC .......................... D06M 13/395; D06M 2101/36
See application file for complete search history.

(56) References Cited

U.S. PATENT DOCUMENTS

2005/0085145 A1*  4/2005  Fang .................. D06M 15/423
                                                            428/920

FOREIGN PATENT DOCUMENTS

| CN | 102587131 | A |   | 7/2012 |              |
|----|-----------|---|---|--------|--------------|
| CN | 103469573 | A |   | 12/2013|              |
| CN | 105803789 |   | * | 7/2016 |              |
| CN | 105803789 | A |   | 7/2016 |              |
| CN | 107503121 | A |   | 12/2017|              |
| CN | 110565374 | A |   | 12/2019|              |
| EP | 2444548   | A1| * | 4/2012 | ..... D03D 13/008 |
| JP | H10273877 | A |   | 10/1998|              |
| JP | 2003342877| A |   | 12/2003|              |
| JP | 2004218107|   | * | 8/2004 |              |

OTHER PUBLICATIONS

The International Search Report in counterpart PCT Application No. PCT/CN2020/102922, dated Oct. 20, 2020.
The First Office Action in counterpart Chinese Application No. 201910818877.4, dated Nov. 30, 2020.
The Notification to Grant Patent Right for Invention in counterpart Chinese Application No. 201910818877.4, dated Jun. 8, 2021.
Liwu Zu, "Processing Technology of Chemical Fibers, 1st Edition", Harbin Institute of Technology Publishing House, Sep. 30, 2014, pp. 373-374, ISBN 978-7-5603-4583-3.

* cited by examiner

*Primary Examiner* — Amina S Khan

(57) ABSTRACT

The present disclosure provides a cross-linking enhanced meta-aramid and a preparation method therefor. In the method, an isocyanate is used as a cross-linking agent, treatment is performed for a period of time at a certain temperature after a catalyst is added, and then water washing, drying, and heat setting are performed to prepare a high-strength meta-aramid. With the present disclosure, a cross-linked meta-aramid is prepared and has an improved binding force between fibers and has excellent mechanical properties and high temperature resistance.

7 Claims, 1 Drawing Sheet

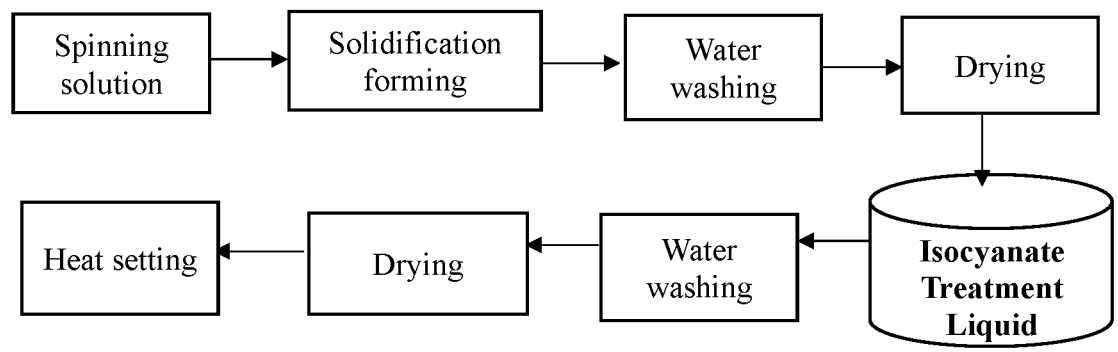

CROSS-LINKED ENHANCED META-ARAMID AND PREPARATION METHOD THEREFOR

CROSS-REFERENCE TO RELATED APPLICATIONS

The present application is a continuation of International Application No. PCT/CN2020/102922, filed on Jul. 20, 2020, which claims priority to Chinese Patent Application No. 201910818877.4, filed on Aug. 30, 2019, the entire disclosures of which are incorporated herein by reference.

TECHNICAL FIELD

The present disclosure relates to the field of meta-aramids, and more particularly, to a cross-linking enhanced meta-aramid and a preparation method therefor.

BACKGROUND

A meta-aramid is an excellent high temperature resistant fiber, and its total amount ranks second among special fibers. Foreign companies producing meta-aramids mainly include DuPont in the United States, Teijin in Japan, and Woongjin in South Korea. DuPont in the United States took the lead in realizing the commercial production of meta-aramids, and Nomex® meta-aramids account for more than half of the total production of meta-aramids in the world. For domestic meta-aramid products, the production capacity is continuously increasing, the product diversity is constantly enriched, and the product quality is continuously improved, and thus the market share and product competitiveness of domestically prepared meta-aramids can increase in many high-end fields.

Poly(m-phenylene isophthalamide) is a zigzag macromolecule with a regular arrangement. Due to its excellent properties such as flame retardance, insulation, radiation resistance, high strength, and high modulus, poly(m-phenylene isophthalamide) is widely used in safety protection, environmental protection filtration, structural enhancement, electrical insulation and other aspects of energy, transportation, chemical industry, electronics, and other industries. The current enhancement technologies for meta-aramids include chemical methods and physical methods. The physical methods include altering fiber wettability by using ultraviolet rays, high-energy radiation, plasma, etc. The chemical methods include surface activation such as etching, introduction of functional groups, and diffusion, and surface grafting such as addition of monomers, thereby improving the fiber surface composition and structure. However, in a process of preparing meta-aramids by the above methods, due to low surface energy of meta-aramids, the lack of chemically active functional groups, poor reactivity, a weak fiber transverse binding force, and a low transverse strength, the meta-aramids are prone to fracture under an action of compression and shearing force, and the strength of the prepared meta-aramids is therefore unsatisfactory in some practical applications.

SUMMARY

An objective of the present disclosure aims to overcome the above defects in the related art, and to provide a cross-linking enhanced meta-aramid and a preparation method therefor. The preparation method is to solve the problem that the meta-aramid is prone to fracture under an action of compression and shearing force due to its low surface energy, weak fiber transverse binding force, and low transverse strength.

To achieve the above objective, the present disclosure adopts the following technical solutions.

A cross-linking enhanced meta-aramid is provided. The cross-linking enhanced meta-aramid has a structural formula of:

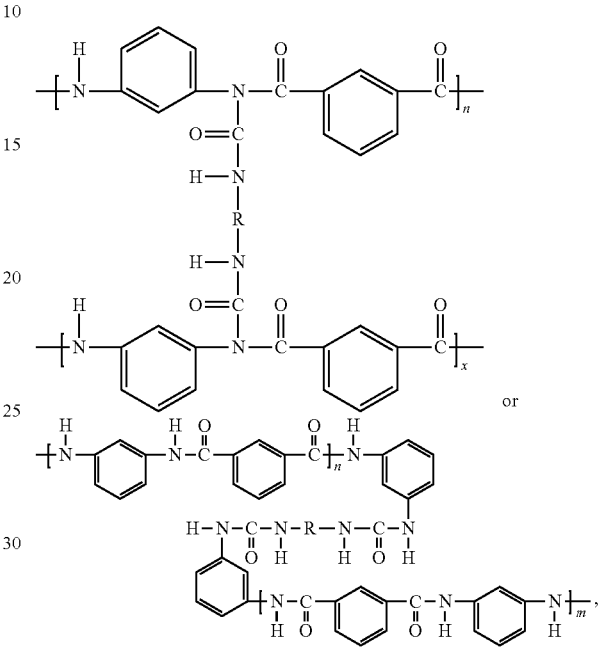

where $80 \leq n \leq 150$, $80 \leq x \leq 150$, $80 \leq m \leq 150$; and R is one or more of

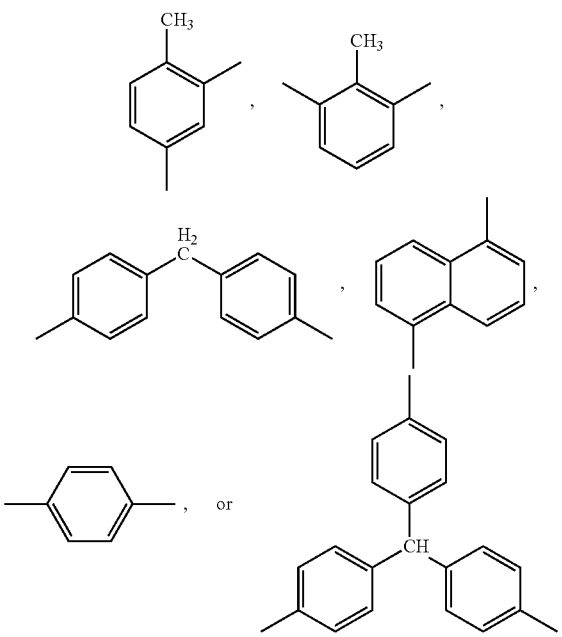

A preparation method for a cross-linking enhanced meta-aramid is provided. The preparation method includes: placing meta-aramid precursor fibers in an organic solution of isocyanate containing a catalyst, letting stand for reaction to obtain a cross-linked meta-aramid, and subjecting the cross-linked meta-aramid to water washing, drying, and heat setting to obtain the cross-linking enhanced meta-aramid.

Further improvements of the present disclosure are as follows.

Preferably, the isocyanate is one or more of 2,4-toluene diisocyanate, 2,6-toluene diisocyanate, 4,4'-diphenylmethane diisocyanate, naphthyl 1,5-diisocyanate, p-phenylene diisocyanate, or triphenylmethane triisocyanate.

Preferably, the catalyst is one or two of stannous octoate, lead octoate, cobalt octoate, iron octoate, dibutyltin dilaurate, tetraisobutyl orthotitanate, or triethylenediamine.

Preferably, an organic solvent in the organic solution is N,N-dimethylacetamide, N,N-dimethylformamide, N-methylpyrrolidone, or dimethylsulfoxide.

Preferably, in the organic solution of isocyanate containing the catalyst, a mass content of the isocyanate ranges from 1% to 10%, a mass content of the catalyst ranges from 0.5% to 3%, and the rest is an organic solvent.

Preferably, the meta-aramid precursor fibers are let stand in the organic solution of isocyanate containing the catalyst for reaction at a temperature of 40° C. to 150° C. for 5 min to 60 min.

Preferably, the cross-linked meta-aramid, after being washed with water, is dried at a temperature of 120° C. to 180° C. until a moisture content of the cross-linked meta-aramid is smaller than 5%, followed by the heat setting.

Preferably, the heat setting is performed at a temperature of 200° C. to 400° C. with a heat drawing ratio of 1.5 to 4, until the meta-aramid is stably formed.

Preferably, the meta-aramid precursor fibers are obtained by forming a meta-aramid by wet spinning, followed by water washing and drying.

Compared with the prior art, the present disclosure can provide the following advantageous effects.

The present disclosure discloses a cross-linking enhanced meta-aramid. The cross-linking enhanced meta-aramid is prepared by cross-linking a conventional meta-aramid with isocyanate to provide covalent bond interaction between molecular chains, increase a force between molecular chains, and improve a fiber density. In a process of fiber stretching and deformation, a relative sliding displacement between molecular chains can be reduced, and rigidity of molecular chains of fibers can be improved, thereby improving a breaking tensile strength of the fibers.

The present disclosure also discloses a preparation method for a cross-linking enhanced meta-aramid. In the method, an existing meta-aramid is treated with an organic solution of isocyanate containing a catalyst at a certain temperature to enable amide bonds and hydrogens on amino groups in original molecular chains to have a bonding reaction with isocyanate groups, and thus covalent bonds are formed between adjacent molecular chains. Then, after the procedures of water washing, drying, and heat-setting, a high-strength meta-aramid is prepared. During the preparation, the solvent swells fibers during preparation, a certain concentration of the isocyanate and a certain concentration of the catalyst ensure that reactants can enter between molecular chains to react with the molecular chains, and certain temperature and time ensure a sufficient reaction.

BRIEF DESCRIPTION OF DRAWINGS

The FIGURE is a flow chart illustrating a preparation process of the present disclosure.

DESCRIPTION OF EMBODIMENTS

The present disclosure will be described in further detail below in conjunction with a specific process and the accompanying drawings. The present disclosure provides a cross-linking enhanced meta-aramid and a preparation method therefor. In the method, an isocyanate is used as a cross-linking agent, treatment is performed for a period of time at a certain temperature after a catalyst is added, and then water washing, drying, and heat setting are performed to prepare a high-strength meta-aramid.

A reaction formula of the treatment of the meta-aramid is given as below:

(1)

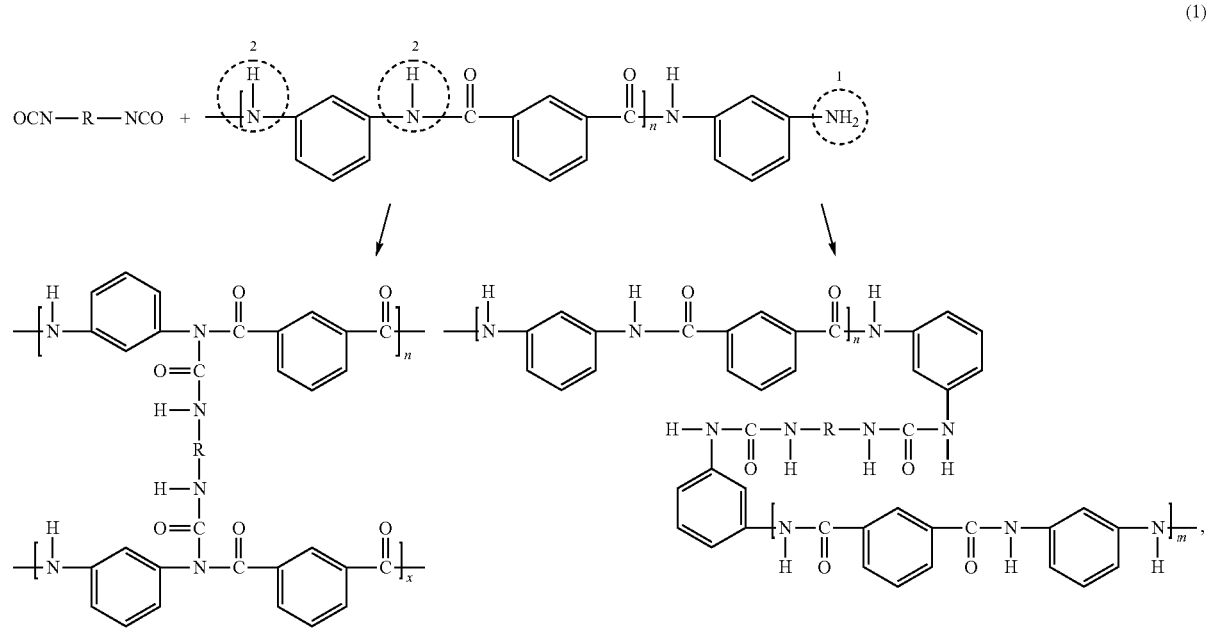

R in the molecular formula is one or more of:

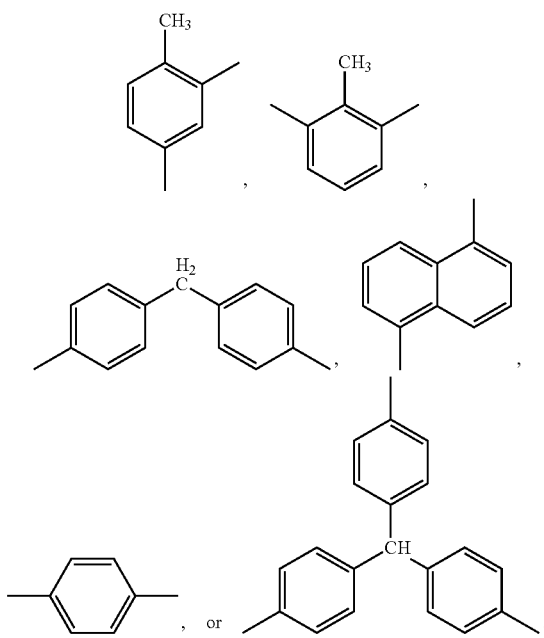

Referring to the FIGURE, a specific preparation process for a cross-linking enhanced meta-aramid includes the following steps.

At step 1, a meta-aramid is prepared by wet spinning.

A meta-aramid spinning solution is subjected to forming, water washing, and drying to obtain meta-aramid precursor fibers. This meta-aramid can directly adopt a meta-aramid prepared according to patent CN201510915358 or CN200910259778.

At step 2, the meta-aramid precursor fibers are placed in an organic solution of isocyanate containing a catalyst for treatment.

The meta-aramid precursor fibers are let stand in the organic solution of isocyanate containing the catalyst at 40° C. to 150° C. for 5 min to 60 min to obtain the treated meta-aramid spinning fibers; and in the organic solution of isocyanate containing the catalyst, a mass content of the isocyanate ranges from 1% to 10%, a mass content of the catalyst ranges from 0.5% to 3%, and the rest is an organic solvent. The isocyanate is one or more of 2,4-toluene diisocyanate, 2,6-toluene diisocyanate, 4,4'-diphenylmethane diisocyanate (MDI), naphthyl 1,5-diisocyanate (NDI), p-phenylene diisocyanate (PPDI), or triphenylmethane triisocyanate (PMDI). When the isocyanate is more than one of 2,4-toluene diisocyanate, 2,6-toluene diisocyanate, 4,4'-diphenylmethane diisocyanate (MDI), naphthyl 1,5-diisocyanate (NDI), p-phenylene diisocyanate (PPDI), or triphenylmethane triisocyanate (PMDI), they can be mixed in any ratio.

The catalyst is one or two of stannous octoate, lead octoate, cobalt octoate, iron octoate, dibutyltin dilaurate, tetraisobutyl orthotitanate, or triethylenediamine. When the catalyst is two of stannous octoate, lead octoate, cobalt octoate, iron octoate, dibutyltin dilaurate, tetraisobutyl orthotitanate, or triethylenediamine, they can be mixed in any ratio.

The organic solvent in the organic solution is N,N-dimethylacetamide (DMAc), N,N-dimethylformamide (DMF), N-methylpyrrolidone (NMP), or dimethylsulfoxide (DMSO), etc.

At step 3, the meta-aramid after the treatment is washed with water, dried, and heat-set to obtain a high-strength meta-aramid; the drying is performed at a temperature of 120° C. to 180° C. until a fiber moisture content of the meta-aramid is smaller than 5%; and the heat setting is performed at a temperature of 200° C. to 400° C. with a heat drawing ratio of 1.5 to 4, until the meta-aramid is stably formed.

The present disclosure performs cross-linking on the prepared meta-aramid to increase the binding force between fibers, and provide excellent mechanical properties and high temperature resistance performance.

The process is further described below in combination with specific embodiments.

Embodiment 1

The meta-aramid prepared by wet spinning forming, water washing, and drying was then immersed in a 70° C. treatment solution. In the treatment solution, a content of MDI was 1% (mass percentage, same hereinafter), a content of stannous octoate was 0.5%, and a solvent was DMAc. Treatment time was 10 min. Then, water washing, drying at a temperature of 150° C., and heat setting at a temperature of 200° C. were performed to obtain a cross-linking enhanced meta-aramid.

Embodiment 2

The meta-aramid prepared by wet spinning forming, water washing, and drying was then immersed in a 100° C. treatment solution. In the treatment solution, a content of MDI was 1%, a content of stannous octoate was 0.5%, and a solvent was DMAc. Treatment time was 10 min. Then, water washing, drying at a temperature of 150° C., and heat setting at a temperature of 220° C. were performed to obtain a cross-linking enhanced meta-aramid.

Embodiment 3

The meta-aramid prepared by wet spinning forming, water washing, and drying was then immersed in a 70° C. treatment solution. In the treatment solution, a content of MDI was 5%, a content of stannous octoate was 0.5%, and a solvent was DMAc. Treatment time was 15 min. Then, water washing, drying at a temperature of 120° C., and heat setting at a temperature of 360° C. were performed to obtain a cross-linking enhanced meta-aramid.

Embodiment 4

The meta-aramid prepared by wet spinning forming, water washing, and drying was then immersed in an 80° C. treatment solution. In the treatment solution, a content of MDI was 10%, a content of stannous octoate was 1%, and a solvent was DMAc. Treatment time was 8 min. Then, water washing, drying at a temperature of 120° C., and heat setting at a temperature of 240° C. were performed to obtain a cross-linking enhanced meta-aramid.

Embodiment 5

The meta-aramid prepared by wet spinning forming, water washing, and drying was then immersed in a 70° C. treatment solution. In the treatment solution, a content of MDI was 10%, a content of stannous octoate was 1%, and a solvent was DMAc. Treatment time was 8 min. Then, water washing, drying at a temperature of 170° C., and heat setting at a temperature of 280° C. were performed to obtain a cross-linking enhanced meta-aramid.

Embodiment 6

The meta-aramid prepared by wet spinning forming, water washing, and drying was then immersed in an 80° C. treatment solution. In the treatment solution, a content of MDI was 8%, a content of stannous octoate was 1%, and a solvent was DMAc. Treatment time was 15 min. Then, water washing, drying at a temperature of 160° C., and heat setting at a temperature of 300° C. were performed to obtain a cross-linking enhanced meta-aramid.

Embodiment 7

The meta-aramid prepared by wet spinning forming, water washing, and drying was then immersed in an 80° C. treatment solution. In the treatment solution, a content of NDI was 8%, a content of stannous octoate was 1%, and a solvent was DMAc. Treatment time was 8 min. Then, water washing, drying at a temperature of 140° C., and heat setting at a temperature of 260° C. were performed to obtain a cross-linking enhanced meta-aramid.

Embodiment 8

The meta-aramid prepared by wet spinning forming, water washing, and drying was then immersed in a 70° C. treatment solution. In the treatment solution, a content of NDI was 10%, a content of stannous octoate was 1%, and a solvent was DMAc. Treatment time was 15 min. Then, water washing, drying at a temperature of 180° C., and heat setting at a temperature of 220° C. were performed to obtain a cross-linking enhanced meta-aramid.

Embodiment 9

The meta-aramid prepared by wet spinning forming, water washing, and drying was then immersed in a 70° C. treatment solution. In the treatment solution, a content of NDI was 5%, a content of stannous octoate was 0.5%, and a solvent was DMAc. Treatment time was 10 min. Then, water washing, drying at a temperature of 125° C., and heat setting at a temperature of 350° C. were performed to obtain a cross-linking enhanced meta-aramid.

Embodiment 10

The meta-aramid prepared by wet spinning forming, water washing, and drying was then immersed in an 80° C. treatment solution. In the treatment solution, a content of MDI was 10%, a content of stannous octoate/triethylenediamine was 1% (a mass ratio, 3:1), and a solvent was DMAc. Treatment time was 8 min. Then, water washing, drying at a temperature of 135° C., and heat setting at a temperature of 380° C. were performed to obtain a cross-linking enhanced meta-aramid.

COMPARATIVE EXAMPLE

The meta-aramid prepared by wet spinning forming, water washing, and drying was then heat set without any treatment to obtain an untreated meta-aramid.

Samples of cross-linking enhanced meta-aramids prepared according to Embodiments 1 to 10 were numbered 1 to 10, respectively, and a sample of the comparative example was numbered $P_a$. Samples taken from Embodiments 1 to 10 before the heat setting were numbered 11 to 20, respectively, and a sample taken from the comparative example before the heat setting was numbered $P_b$.

Test results of mechanical properties and heat resistance of the samples according to Embodiments 1 to 10 and the comparative example are shown in Table 1 below.

TABLE 1

Test results of Embodiments 1 to 10 and the comparative example

| Sample | Breaking strength (cN/dtex) | Elongation at break (%) | Modulus (cN/dtex) | Thermal shrinkage (%) |
| --- | --- | --- | --- | --- |
| 1 | 4.35 | 26.84 | 48.22 | 1.30 |
| 2 | 4.51 | 29.15 | 49.51 | 1.21 |
| 3 | 4.61 | 26.82 | 50.23 | 1.25 |
| 4 | 4.69 | 27.51 | 49.87 | 1.19 |
| 5 | 4.81 | 27.93 | 49.82 | 1.14 |
| 6 | 4.75 | 26.81 | 51.40 | 1.17 |
| 7 | 4.66 | 26.22 | 50.93 | 1.20 |
| 8 | 4.55 | 28.15 | 50.89 | 1.27 |
| 9 | 4.49 | 29.09 | 48.91 | 1.18 |
| 10 | 4.42 | 29.46 | 47.89 | 1.26 |
| Pa | 3.89 | 28.11 | 45.55 | 1.61 |
| 11 | 2.75 | 38.68 | 31.50 | 35.01 |
| 12 | 2.84 | 37.52 | 33.11 | 34.68 |
| 13 | 2.79 | 36.78 | 36.03 | 32.19 |
| 14 | 2.88 | 36.01 | 36.61 | 31.87 |
| 15 | 2.90 | 37.16 | 37.02 | 31.16 |
| 16 | 2.78 | 34.68 | 37.89 | 31.01 |
| 17 | 2.88 | 34.84 | 38.06 | 31.12 |
| 18 | 2.76 | 35.89 | 36.12 | 34.87 |
| 19 | 2.71 | 35.33 | 35.89 | 33.41 |
| 20 | 2.83 | 34.51 | 35.15 | 34.55 |
| $P_b$ | 2.51 | 38.85 | 39.21 | 40.16 |

The test results in Table 1 show that the isocyanate cross-linking agent combined with subsequent treatment have significant improvement effects on the mechanical properties and heat resistance of the meta-aramid. The above results also show that after the use of the cross-linking agent in the present disclosure, the mechanical properties and heat resistance of the meta-aramid are significantly improved after the heat-setting. The reason is that in the process of the heat setting, heat treatment was carried out at a temperature higher than a glass transition temperature, fibers are softened, and stretching was performed at the same time, such that molecular chains tend to be consistently arranged in a direction along the extension axis of the fibers, and orientation regularity of the molecular chains in the fibers is improved, thereby improving the breaking strength of the fibers. Although breaking strengths of both cross-linked and uncross-linked fibers were increased after the heat setting, magnitudes of the increase and breaking strengths of dried (without the heat treatment) fibers were quite different. It can also be seen from the data in Table 1 that the dried fiber $P_b$ without cross-linking treatment has a breaking strength of 2.51 cN/dtex, which is lower than that of the dried fibers with cross-linking treatment (samples 11 to 20). This indicates that the cross-linked and then dried fibers form covalent bonds between the molecular chains, which enhance an intermolecular force, thereby increasing the breaking strength during a stretching process. After the heat treatment, the fiber molecular structures are reordered. Due to covalent bonds between molecules, the cross-linked fibers are ordered more compact and regular, and therefore have a significantly higher tensile strength than the uncross-linked fibers.

Embodiment 11

The meta-aramid prepared by wet spinning forming, water washing, and drying was then immersed in a 40° C. treatment solution. In the treatment solution, a content of 2,4-toluene diisocyanate was 8%, a content of lead octoate was 0.8%, and a solvent was DMF. Treatment time was 60 min. Then, water washing, drying at a temperature of 145° C., and heat setting at a temperature of 360° C. were performed to obtain a cross-linking enhanced meta-aramid.

Embodiment 12

The meta-aramid prepared by wet spinning forming, water washing, and drying was then immersed in a 50° C. treatment solution. In the treatment solution, a content of PPDI was 4%, a content of cobalt octoate was 1.2%, and a solvent was DMAc. Treatment time was 50 min. Then, water washing, drying at a temperature of 155° C., and heat setting at a temperature of 340° C. were performed to obtain a cross-linking enhanced meta-aramid.

Embodiment 13

The meta-aramid prepared by wet spinning forming, water washing, and drying was then immersed in a 100° C. treatment solution. In the treatment solution, a content of PMDI was 3%, a content of iron octoate was 3%, and a solvent was NMP. Treatment time was 40 min. Then, water washing, drying at a temperature of 165° C., and heat setting at a temperature of 380° C. were performed to obtain a cross-linking enhanced meta-aramid.

Embodiment 14

The meta-aramid prepared by wet spinning forming, water washing, and drying was then immersed in a 120° C. treatment solution. In the treatment solution, a content of 2,6-toluene diisocyanate was 2%, a content of dibutyltin dilaurate was 2.8%, and a solvent was DMSO. Treatment time was 30 min. Then, water washing, drying at a temperature of 175° C., and heat setting at a temperature of 400° C. were performed to obtain a cross-linking enhanced meta-aramid.

Embodiment 15

The meta-aramid prepared by wet spinning forming, water washing, and drying was then immersed in a 150° C. treatment solution. In the treatment solution, a content of PPDI and PMDI was 6% (3% each), a content of tetraisobutyl orthotitanate was 2.5%, and a solvent was DMF. Treatment time was 20 min. Then, water washing, drying at a temperature of 180° C., and heat setting at a temperature of 200° C. were performed to obtain a cross-linking enhanced meta-aramid.

Embodiment 16

The meta-aramid prepared by wet spinning forming, water washing, and drying was then immersed in a 120° C. treatment solution. In the treatment solution, a content of MDI, NDI, and PPDI was 7% (2% MDI, 2% NDI, and 3% PPDI), a content of triethylenediamine was 2%, and a solvent was DMAc. Treatment time was 5 min. Then, water washing, drying at a temperature of 150° C., and heat setting at a temperature of 350° C. were performed to obtain a cross-linking enhanced meta-aramid.

Embodiment 17

The meta-aramid prepared by wet spinning forming, water washing, and drying was then immersed in a 50° C. treatment solution. In the treatment solution, a content of NDI and PMDI was 5% (2% NDI and 3% PMDI), a content of cobalt octoate and iron octoate was 0.9% (0.4% cobalt octoate and 0.5% iron octoate), and a solvent was NMP. Treatment time was 10 min. Then, water washing, drying at a temperature of 120° C., and heat setting at a temperature of 260° C. were performed to obtain a cross-linking enhanced meta-aramid.

Embodiment 18

The meta-aramid prepared by wet spinning forming, water washing, and drying was then immersed in a 40° C. treatment solution. In the treatment solution, a content of 2,4-toluene diisocyanate and PMDI was 10% (5% 2,4-toluene diisocyanate and 5% PMDI), a content of dibutyltin dilaurate and tetraisobutyl orthotitanate was 1.5% (1% dibutyltin dilaurate and 0.5% tetraisobutyl orthotitanate), and a solvent was DMAc. Treatment time was 45 min. Then, water washing, drying at a temperature of 120° C., and heat setting at a temperature of 280° C. were performed to obtain a cross-linking enhanced meta-aramid.

Embodiment 19

The meta-aramid prepared by wet spinning forming, water washing, and drying was then immersed in a 60° C. treatment solution. In the treatment solution, a content of MDI, PPDI, and PMDI was 1% (0.5% MDI, 0.3% PPDI, and 0.2% PMDI), a content of stannous octoate and tetraisobutyl orthotitanate was 1.2% (0.4% stannous octoate and 0.8% tetraisobutyl orthotitanate), and a solvent was DMAc. Treatment time was 35 min. Then, water washing, drying at a temperature of 170° C., and heat setting at a temperature of 300° C. were performed to obtain a cross-linking enhanced meta-aramid.

Embodiment 20

The meta-aramid prepared by wet spinning forming, water washing, and drying was then immersed in a 130° C. treatment solution. In the treatment solution, a content of 2,6-toluene diisocyanate, MDI, and NDI was 5% (1% 2,6-toluene diisocyanate, 2% MDI, and 2% NDI), a content of iron octoate and dibutyltin dilaurate was 1.7% (0.8% iron octoate and 0.9% dibutyltin dilaurate), and a solvent was DMAc. Treatment time was 25 min. Then, water washing, drying at a temperature of 180° C., and heat setting at a temperature of 260° C. were performed to obtain a cross-linking enhanced meta-aramid.

The above description only describes preferred embodiments of the present disclosure, and is not intended to limit the present disclosure. Any modification, equivalent replacement, or improvement, etc., made within the ideas and principles of the present disclosure shall be included within the protection scope of the present disclosure.

What is claimed is:

1. A preparation method for a cross-linking enhanced meta-aramid, comprising: placing meta-aramid precursor fibers in an organic solution of isocyanate containing a catalyst, letting stand for reaction to obtain a cross-linked meta-aramid, and subjecting the cross-linked meta-aramid to water washing, drying, and heat setting to obtain the cross-linking enhanced meta-aramid, wherein:

the isocyanate is selected from one or more of 2,4-toluene diisocyanate, 2,6-toluene diisocyanate, 4,4'-diphenylmethane diisocyanate, naphthyl 1,5-diisocyanate, p-phenylene diisocyanate, and triphenylmethane triisocyanate;

in the organic solution of isocyanate containing the catalyst, a mass content of the isocyanate ranges from 1% to 10%, a mass content of the catalyst ranges from 0.5% to 3%, and the balance is an organic solvent; and the cross-linking enhanced meta-aramid has a structural formula of:

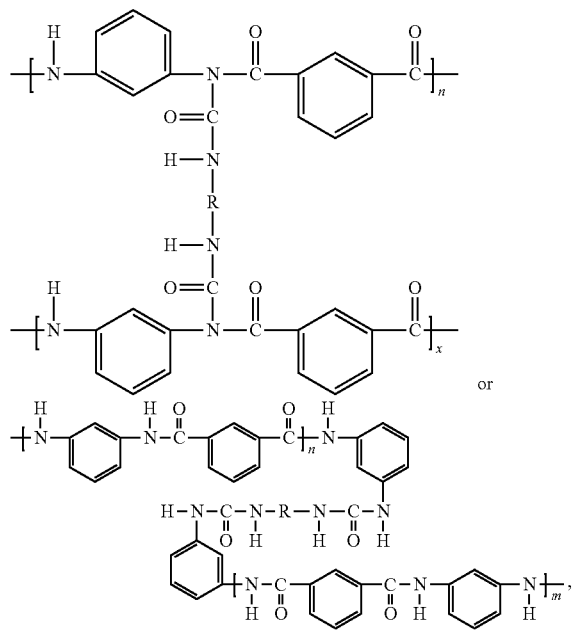

where $80 \leq n \leq 150$, $80 \leq x \leq 150$, $80 \leq m \leq 150$; and
R is selected from one or more of

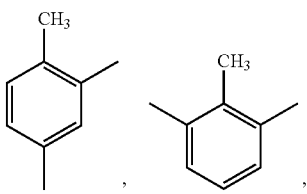

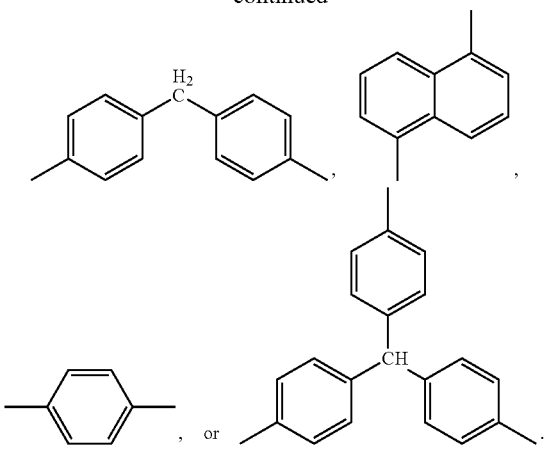

2. The preparation method for the cross-linking enhanced meta-aramid according to claim 1, wherein the catalyst is selected from one or two of stannous octoate, lead octoate, cobalt octoate, iron octoate, dibutyltin dilaurate, tetraisobutyl orthotitanate, and triethylenediamine.

3. The preparation method for the cross-linking enhanced meta-aramid according to claim 1, wherein an organic solvent in the organic solution is selected from N,N-dimethylacetamide, N,N-dimethylformamide, N-methylpyrrolidone, and dimethylsulfoxide.

4. The preparation method for the cross-linking enhanced meta-aramid according to claim 1, wherein the meta-aramid precursor fibers are let stand in the organic solution of isocyanate containing the catalyst for reaction at a temperature of 40° C. to 150° C. for 5 min to 60 min.

5. The preparation method for the cross-linking enhanced meta-aramid according to claim 1, wherein the cross-linked meta-aramid, after being washed with water, is dried at a temperature of 120° C. to 180° C. until a moisture content of the cross-linked meta-aramid is smaller than 5%, followed by the heat setting.

6. The preparation method for the cross-linking enhanced meta-aramid according to claim 1, wherein the heat setting is performed at a temperature of 200° C. to 400° C. with a heat drawing ratio of 1.5 to 4, until the meta-aramid is stably formed.

7. The preparation method for the cross-linking enhanced meta-aramid according to claim 1, wherein the meta-aramid precursor fibers are obtained by forming a meta-aramid by wet spinning, followed by water washing and drying.

* * * * *

UNITED STATES PATENT AND TRADEMARK OFFICE
CERTIFICATE OF CORRECTION

PATENT NO. : 12,404,627 B2
APPLICATION NO. : 17/680363
DATED : September 2, 2025
INVENTOR(S) : Zhenhong Guan et al.

It is certified that error appears in the above-identified patent and that said Letters Patent is hereby corrected as shown below:

On the Title Page

Item [71], Yantai Tayho Advanced Materials Co., Ltd., Yantai (CN) should appear as follows:
TAYHO ADVANCED MATERIALS GROUP CO., LTD., Yantai (CN)

Signed and Sealed this
Ninth Day of December, 2025

John A. Squires
*Director of the United States Patent and Trademark Office*